United States Patent [19]
Fischer

[11] Patent Number: 5,966,298
[45] Date of Patent: Oct. 12, 1999

[54] ELECTRICAL DEVICE WITH A CONSTANT VOLTAGE CONVERTER

[75] Inventor: Harald Fischer, Braunshorn-Ebschied, Germany

[73] Assignee: U.S. Philips Corporation, New York, N.Y.

[21] Appl. No.: 08/914,472

[22] Filed: Aug. 19, 1997

[30] Foreign Application Priority Data

Aug. 21, 1996 [DE] Germany .................. 196 33 664

[51] Int. Cl.⁶ ........................ H02M 3/18; H02M 3/06
[52] U.S. Cl. ........................................... 363/59; 363/62
[58] Field of Search ........................... 363/59, 60, 61, 363/62

[56] References Cited

U.S. PATENT DOCUMENTS

| | | | |
|---|---|---|---|
| 4,654,769 | 3/1987 | Middlebrook | 363/61 |
| 5,132,895 | 7/1992 | Kase | 363/60 |
| 5,345,376 | 9/1994 | Nourbakhsh | 363/62 |
| 5,414,614 | 5/1995 | Fette et al. | 363/59 |
| 5,581,454 | 12/1996 | Collins | 363/59 |
| 5,596,489 | 1/1997 | Bazes | 363/62 |

OTHER PUBLICATIONS

Funkschau Feb. 1995, p. 52.

*Primary Examiner*—Peter S. Wong
*Assistant Examiner*—Bao Q. Vu
*Attorney, Agent, or Firm*—Dicran Halajian

[57] ABSTRACT

Electrical device, in particular a radio device, with an energy storage device. The invention relates to an electrical device, in particular a radio device, with an energy storage device (6) which serves as a current supply. To ensure a high flexibitility in view of the possible use of different energy storage devices with different discharging behaviors, a circuit arrangement (14) is provided for converting a voltage ($U_E$) supplied by the energy storage device into at least one supply voltage ($U_{out}$) which serves for supplying circuits of the electrical device, which is substantially constant, and which is preprogrammable. The circuit arrangement (14) in a first switching state reduces a voltage ($U_E$) supplied by the energy storage device (6) to the supply voltage ($U_{out}$), acting as a downconverter, and in a second switching state steps up a voltage ($U_E$) supplied by the energy storage device (6) to the supply voltage ($U_{out}$), acting as an upconverter. The circuit arrangement (14) comprises components (L, R, S, D, $C_1$) which are used both in the downconverter and in the upconverter.

9 Claims, 3 Drawing Sheets

ELECTRICAL DEVICE WITH A CONSTANT VOLTAGE CONVERTER

BACKGROUND OF THE INVENTION

The invention relates to an electrical device, in particular a radio device, with an energy storage device serving as a current supply.

There is a trend toward ever smaller and lighter user appliances in the field of mobile radio terminals. The energy storage devices used play an important part as regards the appliance weight because they account for a major portion of the total weight of the appliance. Accumulators are mostly used as energy storage devices. It is a simultaneous object in the design of the energy storage devices to achieve the longest possible operation time by means of the energy which can be stored in the energy storage device. The journal Funkschau 2/95, p. 52, refers to the use of lithium accumulators in mobile radio terminals operating in accordance with the GSM standard ("Global System of Mobile communications"). No further particulars are given on how to realize mobile radio terminals with such accumulators. A particular problem in this connection is the adaptation to the discharging behavior which is different from that of other energy storage devices.

SUMMARY OF THE INVENTION

The invention has accordingly for its object to provide an electrical device of the kind mentioned in the opening paragraph which has a high flexibility of use as regards the application possibility of different energy storage devices with different discharging behaviors.

This object is achieved in that a circuit arrangement is provided for converting a voltage supplied by the energy storage device into at least one supply voltage which serves to supply circuits of the electrical device, which is substantially constant, and which is preprogrammable, in that said circuit arrangement in a first switching state acts as a downconverter and reduces a voltage supplied by the energy storage device to the supply voltage, in that said circuit arrangement in a second switching state acts as an upconverter and steps up a voltage supplied by the energy storage device to the supply voltage, and in that components of said circuit arrangement serve for use both in the downconverter and in the upconverter. In particular, software-controlled switches are provided whose switching positions determine whether the components serving for use both in the downconverter and in the upconverter form part of the downconverter or of the upconverter.

A voltage supplied by the energy storage device which is too high compared with the required supply voltage can be reduced to the required value by means of the downconverter. Similarly, a voltage supplied by the energy storage device can be increased by means of the upconverter when the voltage supplied by the energy storage device is lower than the required supply voltage. This is particularly advantageous when lithium energy storage devices are used, i.e. lithium accumulators or batteries, whose output voltage decreases during the discharging process and passes through a voltage range above as well as a voltage range below usual supply voltages for electronic components, so that an adaptation of the supply voltage to the required supply voltage value is necessary, both by stepping-up and by stepping-down. The use of the same components for the upconverter as well as for the downconverter reduces the amount of circuitry, while the software-controlled switching between the upconverter and the downconverter makes for a fast reaction whenever the falling voltage supplied by the energy storage device reaches the value of the required supply voltage. Usual tolerance thresholds are to be taken into account here, obviously. Instead of the software-controlled switching, control circuits constructed by means of analog techniques are also suitable for the switching mwchanism, but the flexibility thereof is very limited.

A preferred embodiment is characterized in that the circuit arrangement comprises an inductance, a resistor, a diode, a capacitor arrangement, and a switch whose switching frequency is software-controlled, which components in the first switching state of the circuit arrangement act as a downconverter and in the second switching state of the circuit arrangement act as an upconverter. This is in particular so arranged that in the first switching state of the circuit arrangement the voltage supplied by the energy storage device is present between a ground potential and a connection point of a series arrangement comprising the inductance and the resistor, the other connection point of the series arrangement comprising the inductance and the resistor is connected on the one hand to a connection point of the switch having a software-controlled switching frequency, whose other connection point is connected to ground potential, and on the other hand to the anode of the diode, the capacitor arrangement is connected between the cathode of the diode and the ground potential, and the supply voltage is derived from the capacitor arrangement, and that in the second switching state of the circuit arrangement the voltage supplied by the energy storage device is applied between the ground potential and a connection point of the switch having a software-controlled switching frequency, whose other connection point is connected on the one hand to the cathode of the diode and on the other hand to a connection point of a series arrangement comprising the inductance and the resistor, the capacitor arrangement is connected between the other connection point of the series arrangement comprising the inductance and the resistor and the ground potential, and the supply voltage is again derived from the capacitor arrangement. A circuit arrangement with the smallest possible amount of circuitry is achieved thereby. The number of components required and the software required for controlling the switch are both small.

If the capacitor arrangement comprises several capacitors, of which at least one capacitor can be made inactive through software control so as to change the total capacitance of the capacitor arrangement in dependence on whether the first or the second switching state obtains, a suitable and sufficiently fast adaptation of the total capacitance of the capacitor arrangement to achieve the required values for use as an upconverter component and as a downconverter component can be achieved in a simple manner.

An inexpensive implementation of the invention, in particular for the purpose of mass manufacture, is achieved in that the circuit arrangement and the means provided for controlling the switching state thereof are arranged on a single chip.

The invention also relates to a circuit arrangement for converting a variable first voltage into at least one substantially constant and preprogrammable second voltage, which circuit arrangement in a first switching state as a downconverter reduces the first voltage to the second voltage, which circuit arrangement in a second switching state as an upconverter steps up the first voltage to the second voltage, and in which circuit arrangement components are provided which serve for use both in the downconverter and in the upconverter. In particular, the circuit arrangement comprises switches which can be controlled by means of software control and whose switching position determines whether the components serving for use both in the downconverter and in the upconverter act as parts of the downconverter or as parts of the upconverter.

BRIEF DESCRIPTION OF THE DRAWING

The invention will be explained in more detail below with reference to the drawing, in which.

DESCRIPTION OF THE PREFERRED EMBODIMENTS

Figure 1:
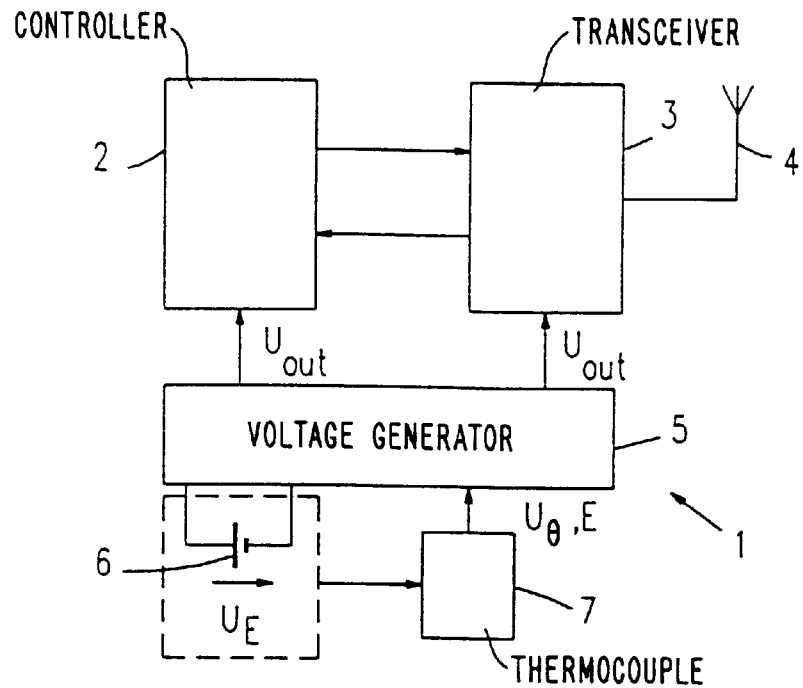
FIG. 1 is a block diagram of an electrical device constructed as a radio device.

FIG. 1 shows an electrical device 1 constructed as a radio device here, whose digital components have been joined together into a functional block 2. The functional block 2 comprises, for example, a base band converter, a digital signal processor, a microprocessor, and storage means such as a ROM and RAM. The functional block 2 may also comprise a microprocessor. The functional block 2 contains the components which carry out the digital signal processing of the radio device 1. A functional block 3 contains the transmission/reception unit of the radio device 1 with an RF part, an IF part, and power amplifier circuits. The components of the functional unit 3 correspond to the components of the functional unit 2. The transmission/reception unit of the functional unit 3 is coupled to an antenna 4 by means of which radio signals are transmitted and received. The radio device 1 comprises a functional unit 5, which is realized as a separate chip in the present case and which serves to generate a supply voltage $U_{out}$ from a voltage $U_E$ supplied by an energy storage device 6 for the current supply of the components of the radio device 1. The energy storage device 6 is constructed as a lithium accumulator in the present case. An alternative realization as a lithium battery or some other type of energy storage is also possible. A device 7 serves for measuring the temperature of the energy storage device 6 and derives from the measured temperature a control voltage $U_{\theta,E}$ which is supplied to the functional unit 5 for further processing. The device 7 comprises, for example, a thermocouple. It is possible by means of the temperature measurement, for example, to detect a state of overheating of the energy storage device 6, so that further measures can be taken for avoiding damage to the energy storage device. A temperature measurement is also necessary during charging of the energy storage device, which charging process takes place with the use of charging algorithms stored in a fixed memory 9 (see FIG. 2).

Figure 2:
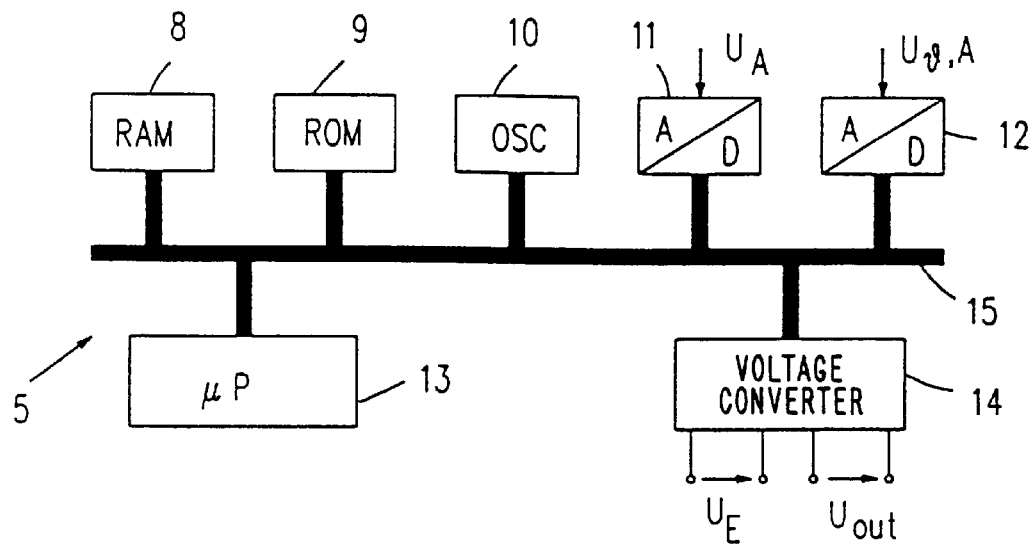
FIG. 2 shows an arrangement for generating a supply voltage from an energy storage voltage.

The construction of the functional block 5 is shown in more detail in FIG. 2. The block is constructed as a separate chip in the present case, comprising a read-write memory (RAM) 8, the fixed memory (ROM) 9 mentioned above and serving as a program memory, an oscillator 10, two analog-digital converters 11 and 12, a control unit which carries out microprocessor functions, and a circuit arrangement 14. The components with reference numerals 8 to 14 are coupled to one another via a bus system 15 incorporated in the chip, so that a mutual communication is rendered possible. The analog-digital converter 11 here serves for digitizing the instantaneous output voltage $U_E$ of the energy storage device 6. The analog-digital converter 12 digitizes the voltage $U_{\theta,E}$ resulting from the temperature measurement. The circuit arrangement 14, which will be explained in more detail further below, is software-controlled by means of programs stored in the fixed memory 9. This circuit arrangement generates from the energy storage voltage $U_E$ supplied to it a supply voltage $U_{out}$ which serves for the current supply of components of the radio device 1. The supply voltage $U_{out}$ is variable, as will be explained below. In addition, several circuit arrangements can be operated in parallel for generating different supply voltages $U_{out}$.

Figure 3:
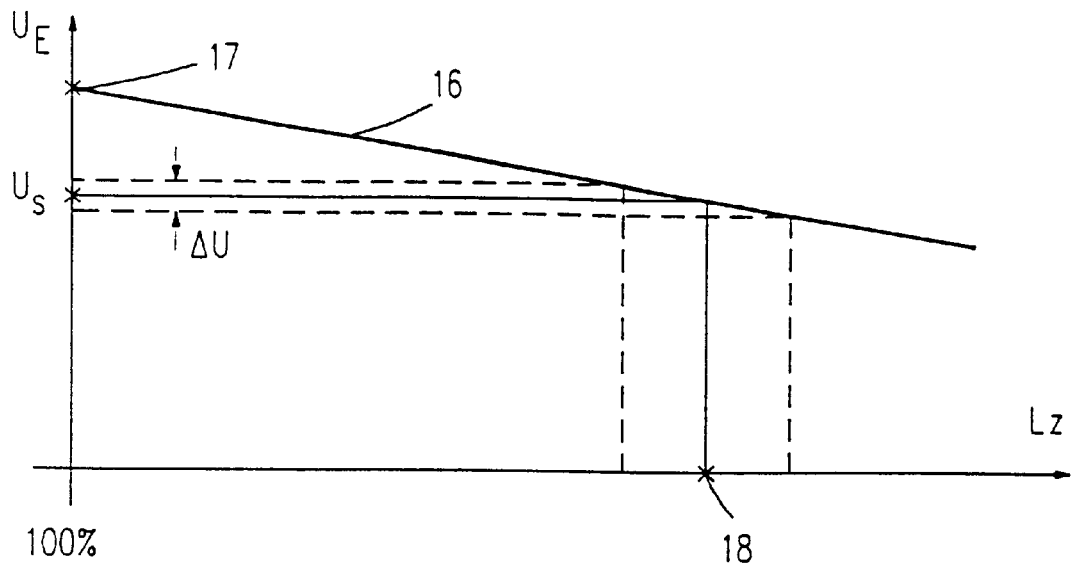
FIG. 3 shows the discharging function of a lithium energy storage device.

The gradient of the energy storage voltage $U_E$ of a lithium energy storage device lithium accumulator or lithium battery) as a function of its charging condition Lz will now be described in more detail with reference to FIG. 3. The lithium energy storage device 6 has a substantially linear discharging curve 16. In the fully charged state (point 17), a lithium accumulator supplies, for example, a voltage $U_E$ of approximately 4 V. The output voltage $U_E$ drops to approximately 2.1 V during the discharging process. A threshold voltage $U_s$ is shown whose value corresponds to that value of the supply voltage $U_{out}$ which is necessary for the current or voltage supply to components of the radio device 1. A typical value for $U_s$ is 2.7 V. This value is derived from a typical supply voltage for digital components of the radio device 1, which is equal to 3 V+/−10%. When the threshold voltage $U_s$ is reached, the charging condition Lz identified with point 18 has been reached.

This value lies in the range between 40 and 50% in the present example. The significance of the threshold voltage $U_s$ will become apparent from the explanations of the following Figures.

Figure 4:
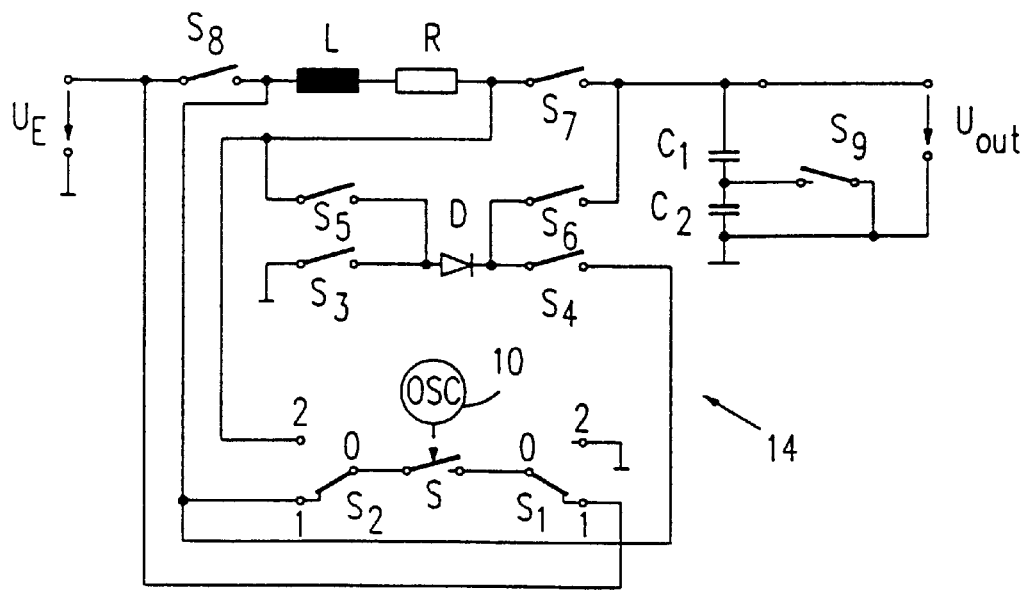
FIG. 4 shows a circuit arrangement for generating a supply voltage from an energy storage voltage.
Figure 5:
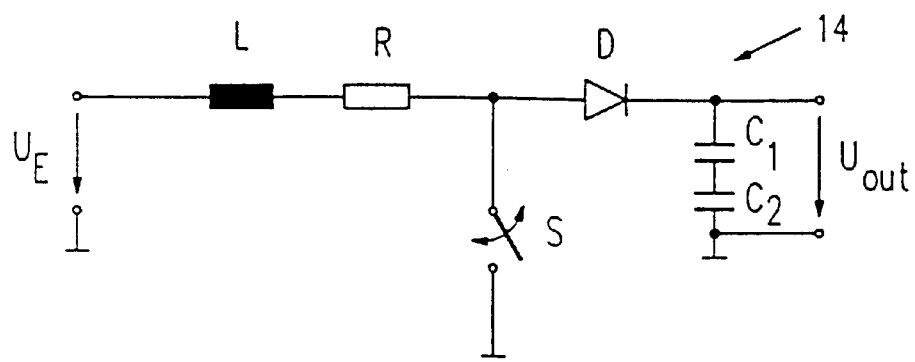
FIG. 5 shows the circuit arrangement of FIG. 4 in its function as an upconverter.
Figure 6:
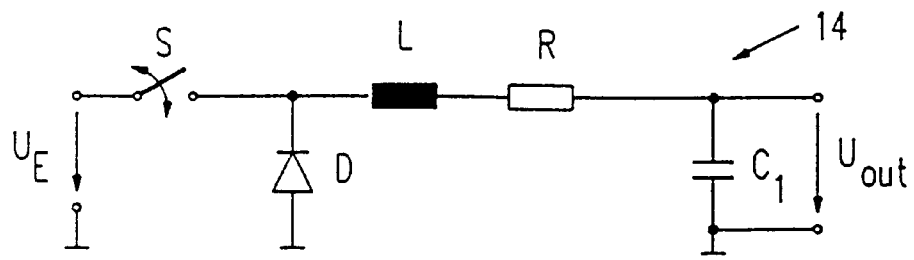
FIG. 6 shows the circuit arrangement of FIG. 4 in its function as a downconverter.

The construction of the circuit arrangement 14 is clarified in FIG. 4. The circuit arrangement 14 comprises an inductance L, a resistor R, a diode D, a switch S, and capacitors $C_1$ and $C_2$. The switch S is opened and closed with a frequency defined by the software-controlled oscillator 10 (see FIG. 2). Furthermore, switches $S_1, S_2, \ldots, S_9$ constructed as semiconductor switches are provided, on whose positions it depends whether the circuit arrangement 14 operates as an upconverter or as a downconverter. If the switches $S_1$ and $S_2$ are in position 02, the switches $S_5$, $S_6$ and $S_8$ are closed, and the other switches $S_3$, $S_4$, $S_7$, and $S_9$ are open, then the circuit arrangement 14 operates as an upconverter. The resulting upconverter is shown in FIG. 5 for greater clarity. However, if the switches $S_1$ and $S_2$ are in position 01, the switches $S_3$, $S_4$, $S_7$, and $S_9$ are closed, and the other switches $S_5$, $S_6$, and $S_8$ are open, then the circuit arrangement 14 operates as a downconverter. The resulting downconverter arrangement is shown in FIG. 6 for greater clarity.

The control of the switches $S_1$ to $S_9$ is effected by means of the control unit 13 (see FIG. 2). It takes place accordingly under software control by means of program parts stored in the fixed memory 9. To achieve this, the functional unit 5 evaluates the energy storage voltage $U_E$. When the measured voltage $U_E$ reaches the threshold voltage $U_s$ of FIG. 3 during the discharging process of the energy storage device 6, the switches $S_1$ to $S_9$ are operated such that a switch-over from the downconverter function to the upconverter function as explained above takes place. Preferably, a tolerance range ΔU (typically a few tenths of a volt) is defined, within which the threshold voltage $U_s$ lies, the switch-over from the downconverter function to the upconverter function taking place when the voltage $U_E$ reaches said range. This is an advantageous practical realization when the measurement of the voltage $U_E$ is not carried out continuously but at regular intervals. It is ensured in that case that a switch-over of the switches $S_1$ to $S_9$ takes place each time when the voltage $U_E$ lies as close to the threshold voltage $U_s$ as possible.

The function of the circuit arrangement 14 in its switching condition as an upconverter is represented in the circuit diagram of FIG. 5. The voltage $U_E$ lies between a ground potential and a connection point of a series arrangement of the inductance L and the resistor R. The other connection point of the series arrangement of the inductance L and the resistor R is connected to a connection point of the switch S and the anode of the diode D.

The other connection point of the switch S is connected to ground potential. The cathode of the diode D is connected to a connection point of the series arrangement of capacitors $C_1$ and $C_2$. The other connection point of the series arrangement of capacitors $C_1$ and $C_2$ is connected to the ground potential. The supply voltage $U_{out}$ is taken off across this series arrangement, i.e. between the cathode of the diode D and ground potential.

Figure 7:
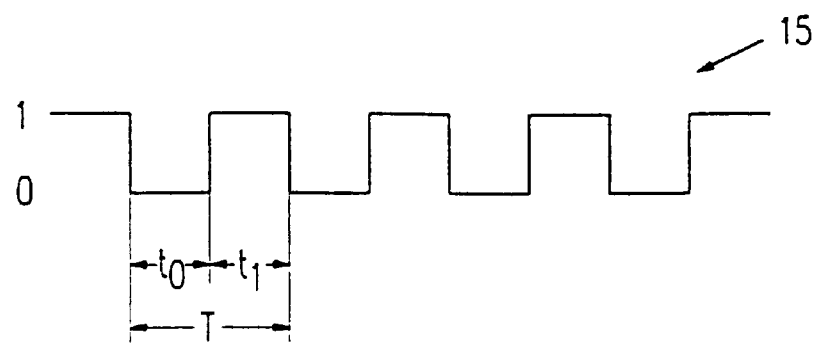
FIG. 7 shows a part of the time function of a control signal for controlling a switch used for switching between the upconverter of FIG. 5 and the downconverter of FIG. 6.

FIG. 6 shows the circuit diagram of the circuit arrangement 14 acting as a downconverter. The voltage $U_E$ then is present between the ground potential and a connection point of the switch S whose other connection point is connected to the cathode of the diode D and to a connection point of the series circuit of the inductance L and the resistor R. The anode of the diode D is connected to ground potential; the other connection point of the series circuit of inductance L and resistor R is connected to a connection point of the capacitor $C_1$, whose other connection point is connected to ground potential. The supply voltage $U_{out}$ is taken off across capacitor $C_1$. Since the switch $S_9$ is closed, the capacitor $C_2$ is short-circuited and inactive. It is accordingly not shown in this circuit diagram. The ratio of the voltage $U_{out}$ to the energy storage voltage $U_E$ can be adapted in accordance with changes in the voltage $U_E$ through variation of the switching frequency of the switch S. The adaptation takes place under software control through evaluation of the measured voltage $U_E$ such that a substantially constant supply voltage $U_{out}$ is generated. The switch S constructed as a semiconductor switch is for this purpose supplied with a digital signal 15 having a variable cycle from the oscillator 10, which signal is diagrammatically shown in FIG. 7. A cycle T of the digital signal 15 is shown therein by way of example, formed through an addition of the time duration $t_1$ and a time duration $t_0$. The time $t_0$ here is the period during which a logic "0" is applied, and the time $t_1$ the period during which a logic "1" is applied to a control input (not shown) of the switch S. The application of a logic "1" causes the switch S to close, the application of a logic "0" causes the switch S to open.

It is true for the upconverter:

$$U_{out}/U_E = T/t_0$$

and for the downconverter:

$$U_{out}/U_E = t_1/T$$

It is accordingly possible through variation of $t_0$, $t_1$, and T to change $U_{out}$ as desired. It is also possible more in particular to vary the generated supply voltage $U_{out}$ temporarily, as desired, by means of the circuit arrangement 14. For example, components of the radio device 1 which are not active simultaneously and which require supply voltages of different levels can be supplied by means of the circuit arrangement 14 only.

The total capacitance C of the series arrangement of $C_1$ and $C_2$ of the upconverter of FIG. 5 is equal to $$C = T * I_{E,max}/\Delta U_E$$

The capacitance value of $C_1$ of the downconverter of FIG. 6 is equal to $$C_1 = I_{E,min} * T/(4 * \Delta U_E)$$

$I_{E,max}$ here represents the maximum system current to be supplied by the energy storage device 6, and $I_{E,min}$ the minimum system current to be supplied by the energy storage device 6. The maximum and minimum system currents follow from the respective maximum and minimum current consumption levels of the components of the radio device 1. $\Delta U_E$ is the voltage swing which the capacitors $C_1$ and $C_2$ have to neutralize, acting as smoothing capacitors. $C_2$ here has the value $C_1/4$.

I claim:
1. An electrical device comprising:
  an energy storage device which provides an input voltage; and
  a circuit which converts said input voltage into a supply voltage which is substantially constant and preprogrammable;
  said circuit having components which are interconnected with switches in a first arrangement and a second arrangement,
  wherein, in a first switching state of said switches, said first arrangement acts as a downconverter and reduces the input voltage to form said supply voltage; and
  wherein, in a second switching state of said switches, said second arrangement acts as an upconverter and steps up the input voltage to form said supply voltage;
  wherein, in said first switching state, said first arrangement includes a diode and a series connection of an inductor and a resistor; a first one of said switches activating with a switching frequency for switchingly providing said input voltage to said inductor; said diode being connected between a ground and an inductor node located between said inductor and said first one of said switches; and said resistor providing said supply voltage across a first capacitor; and
  wherein, in said second switching state, said second arrangement includes a series connection of said inductor, said resistor and said diode; said first one of said switches activating with said switching frequency for switchingly connecting to said ground a resistor node located between said diode and said resistor; said inductor recieving said input voltage and said diode providing said supply voltage across said first capacitor and a second capacitor connected in series to said first capacitor.
2. The electrical device of claim 1, wherein said switches are software controlled.
3. The electrical device of claim 1, wherein said energy storage device is a lithium energy storage device.
4. The electrical device of claim 1, wherein said second capacitor is bypassed in said first arrangement through software control of said switches.

5. The electrical device of claim 1, further comprising controllers for controlling said switches, said controllers and said circuit being arranged on a single chip.

6. A circuit which converts an input voltage into a supply voltage, said circuit comprising components which include an inductor, a resistor, a diode, a first capacitor, a second capacitor and swithces; said switches switching to connect said elements in a first arrangement and a second arrangement;

wherein said first arrangement acts as a downconverter and reduces the input voltage to form said supply voltage; and wherein said second arrangement acts as an upconverter and steps up the input voltage to form said supply voltage;

wherein said first arrangement includes a series connection of said inductor and said resistor; a first one of said switches activating with a switching frequency for switchingly providing said input voltage to said inductor; said diode being connected between a ground and an inductor node located between said inductor and said first one of said switches; and said resistor providing said supply voltage across said first capacitor; and wherein said second arrangement includes a series connection of said inductor, said resistor and said diode; said first one of said switches activating with said switching frequency for connecting to said ground a resistor node located between said diode and said resistor; said inductor receiving said input voltage and said diode providing said supply voltage across a series connection of said first capacitor and said second capacitor.

7. The electrical device of claim 6, wherein said switches are software controlled.

8. The electrical device of claim 6, wherein said second capacitor is bypassed in said first arrangement through software control of said switches.

9. The electrical device of claim 6, further comprising controllers for controlling said switches, said controllers and said circuit being arranged on a single chip.

* * * * *